US011816713B2

(12) United States Patent
Ayad et al.

(10) Patent No.: US 11,816,713 B2
(45) Date of Patent: Nov. 14, 2023

(54) SYSTEMS AND METHODS FOR AUTOMATING TASKS ACROSS MULTIPLE ONLINE STORES

(71) Applicant: SHOPIFY INC., Ottawa (CA)

(72) Inventors: Hanan Ayad, Waterloo (CA); Stanislav Korsei, Vancouver (CA)

(73) Assignee: SHOPIFY INC., Ottawa (CA)

( * ) Notice: Subject to any disclaimer, the term of this patent is extended or adjusted under 35 U.S.C. 154(b) by 359 days.

(21) Appl. No.: 16/662,204

(22) Filed: Oct. 24, 2019

(65) Prior Publication Data

US 2021/0125247 A1    Apr. 29, 2021

(51) Int. Cl.
G06Q 10/0633    (2023.01)
G06Q 10/10      (2023.01)
G06Q 30/0601    (2023.01)
H04L 67/133     (2022.01)

(52) U.S. Cl.
CPC ..... *G06Q 30/0609* (2013.01); *G06Q 10/0633* (2013.01); *G06Q 10/103* (2013.01); *G06Q 30/0639* (2013.01); *G06Q 30/0641* (2013.01); *H04L 67/133* (2022.05)

(58) Field of Classification Search
None
See application file for complete search history.

(56) References Cited

U.S. PATENT DOCUMENTS

| | | | | |
|---|---|---|---|---|
| 9,486,918 B1* | 11/2016 | Earl | | B25J 9/163 |
| 2002/0138543 A1* | 9/2002 | Teng | | G06F 21/6218 |
| | | | | 718/102 |
| 2002/0188597 A1* | 12/2002 | Kern | | G06Q 30/06 |
| 2007/0174101 A1* | 7/2007 | Li | | G06Q 10/063 |
| | | | | 705/7.26 |
| 2010/0262521 A1* | 10/2010 | Robinson | | G06Q 30/06 |
| | | | | 705/29 |
| 2014/0337071 A1* | 11/2014 | Stiffler | | G06F 3/04847 |
| | | | | 705/7.13 |
| 2015/0067687 A1* | 3/2015 | Turner | | G06F 9/4881 |
| | | | | 718/102 |
| 2015/0186939 A1* | 7/2015 | Li | | G06Q 30/0275 |
| | | | | 705/14.54 |
| 2015/0286615 A1* | 10/2015 | Mauceri, Jr. | | G06F 8/30 |
| | | | | 715/235 |
| 2015/0332197 A1* | 11/2015 | Sharma | | G16H 50/20 |
| | | | | 705/2 |

(Continued)

OTHER PUBLICATIONS

Stohr, E.A., Zhao, J.L. Workflow Automation: Overview and Research Issues. Information Systems Frontiers 3, 281-296 (2001). https://doi.org/10.1023/A:1011457324641; (last accessed Aug. 21, 2023).*

*Primary Examiner* — Peter Ludwig
*Assistant Examiner* — Donald J Edmonds

(57) ABSTRACT

A merchant may use an e-commerce platform to sell products to customers on an online store. The merchant may have more than one online store, each with its own separate inventory, orders, domain name (or subdomain), currency, etc. A computer-implemented system and method are provided that allow the merchant to build workflows to automate tasks at the organizational level, i.e. workflows that can incorporate triggers, conditions, and/or actions from and across the different online stores that belong to the merchant.

24 Claims, 13 Drawing Sheets

(56) References Cited

U.S. PATENT DOCUMENTS

| | | | |
|---|---|---|---|
| 2016/0026373 A1* | 1/2016 | Srivastava | G06Q 10/06 |
| | | | 715/765 |
| 2016/0232515 A1* | 8/2016 | Jhas | G06Q 20/3278 |
| 2016/0378575 A1* | 12/2016 | Hansen | G06Q 10/06 |
| | | | 719/318 |
| 2017/0004422 A1* | 1/2017 | Todd | G06Q 20/20 |
| 2017/0147290 A1* | 5/2017 | Kumar | G06Q 10/0633 |
| 2017/0316355 A1* | 11/2017 | Shrestha | G06F 40/123 |
| 2017/0372442 A1* | 12/2017 | Mejias | G16H 40/20 |
| 2018/0096296 A1* | 4/2018 | Papancea | G06Q 10/087 |
| 2018/0157384 A1* | 6/2018 | Baneva | G06F 9/451 |
| 2018/0315003 A1* | 11/2018 | Smith | G06Q 10/083 |
| 2018/0336617 A1* | 11/2018 | Baxter | G06Q 30/0631 |
| 2018/0374015 A1* | 12/2018 | Roos | G06Q 10/1053 |
| 2019/0188035 A1* | 6/2019 | Nicholson | G06Q 10/0633 |
| 2019/0213510 A1* | 7/2019 | Johnston | G06Q 10/0633 |
| 2019/0258524 A1* | 8/2019 | Bartlett | G06Q 10/103 |
| 2019/0318300 A1* | 10/2019 | Cox | G06Q 10/063114 |

* cited by examiner

E-Commerce Platform  |  Q Search  |  JG John's Apparel / Jonny B. Good

- Home
- Orders
- Products
- Costumers
- Reports
- Discounts
- Apps

SALES CHANNELS ⊕ ◈
- Online Store
- Mobile App

View all channels

⚙ Settings

Good afternoon, Jonny B..
Here's what's happening with your store today.

Today's total sales   Today's visits
$98.00                1

● Update your Platform Payments tax details
We require additional information to verify your identity.
[Update tax details]

● Advanced Cash on Delivery has been deactivated for your store
[See why]

All channels ⌄    Today ⌄

TOTAL SALES
$98.00

$125
$75
$25
     12am    4pm    8pm    4pm    11pm
                                  Jun 1
                                  2 orders TOTAL SALES BY CHANNEL          View dashboard
Online Store                    Jun 1
$0.00                           0 orders Mobile app
$0.00                           0 orders Shopify POS (126 York St.)
$0.00                           0 orders

FIG. 2

SYSTEMS AND METHODS FOR AUTOMATING TASKS ACROSS MULTIPLE ONLINE STORES

FIELD

The present application relates to workflows for automating tasks in an e-commerce platform.

BACKGROUND

A merchant may use an e-commerce platform to sell products to customers on an online store. The merchant may have more than one online store, each with its own separate inventory, orders, domain name (or subdomain), currency, etc. For example, the merchant may have three online stores: socks.com, which is their main U.S.A/global store, ca.socks.com, which is a Canada-specific store, and au.socks.com, which is an Australia-specific store. The merchant configures each online store to correspond to a different country of business. As another example, the merchant may have three stores corresponding to three different types of apparel that the merchant sells: socks.com, which sells a variety of socks, shirts.com, which sells shirts, and shoes.com, which sells footwear.

Each online store has its own separate merchant account and login information, and the merchant switches between the different online stores by logging out of one store and logging into another store. This makes it more difficult to manage different online stores that all belong to the same merchant.

To streamline the process of managing a particular online store that belongs to the merchant, the merchant may design and utilize computer-implemented workflows to automate tasks. Automating tasks allows for automated processes or actions, such as the e-commerce platform automatically sending notifications or applying updates based on certain conditions. A workflow is specific to an online store, and can only operate off of triggers and conditions specific to that store.

SUMMARY

It is desired to have a computer-implemented system and method that allows the merchant to build workflows to automate tasks at the organizational level, i.e. workflows that can incorporate triggers, conditions, and/or actions from and across the different online stores that belong to the merchant.

In one embodiment, a computer-implemented method is provided that includes receiving, from a merchant device of a merchant, an indication of a plurality of steps of a workflow. The plurality of steps includes a trigger that triggers the workflow, a condition, and an action to be taken if the condition is met. A particular step of the workflow is associated with a plurality of online stores that belong to the merchant. The method further includes storing the workflow in memory, including storing a respective store identifier for each online store associated with the particular step. The method further includes subsequently executing at least some of the plurality of steps of the workflow, including the particular step. Executing the particular step includes, for at least one online store associated with the particular step: using the respective store identifier for the online store to retrieve information stored in association with the online store, and evaluating the information as part of executing the particular step. In some embodiments, a corresponding system is also disclosed for performing the method. The system includes a memory (e.g. to store the workflow and store a respective store identifier for each online store associated with the particular step), and at least one processor to perform the method steps.

BRIEF DESCRIPTION OF THE DRAWINGS

Embodiments will be described, by way of example only, with reference to the accompanying figures wherein:

FIG. 2 is an example of a home page of an administrator, according to one embodiment;

DETAILED DESCRIPTION

For illustrative purposes, specific example embodiments will now be explained in greater detail below in conjunction with the figures.

Example E-Commerce Platform

The methods disclosed herein may be performed in relation to an e-commerce platform. Therefore, an example of an e-commerce platform will be described.

Figure 1:
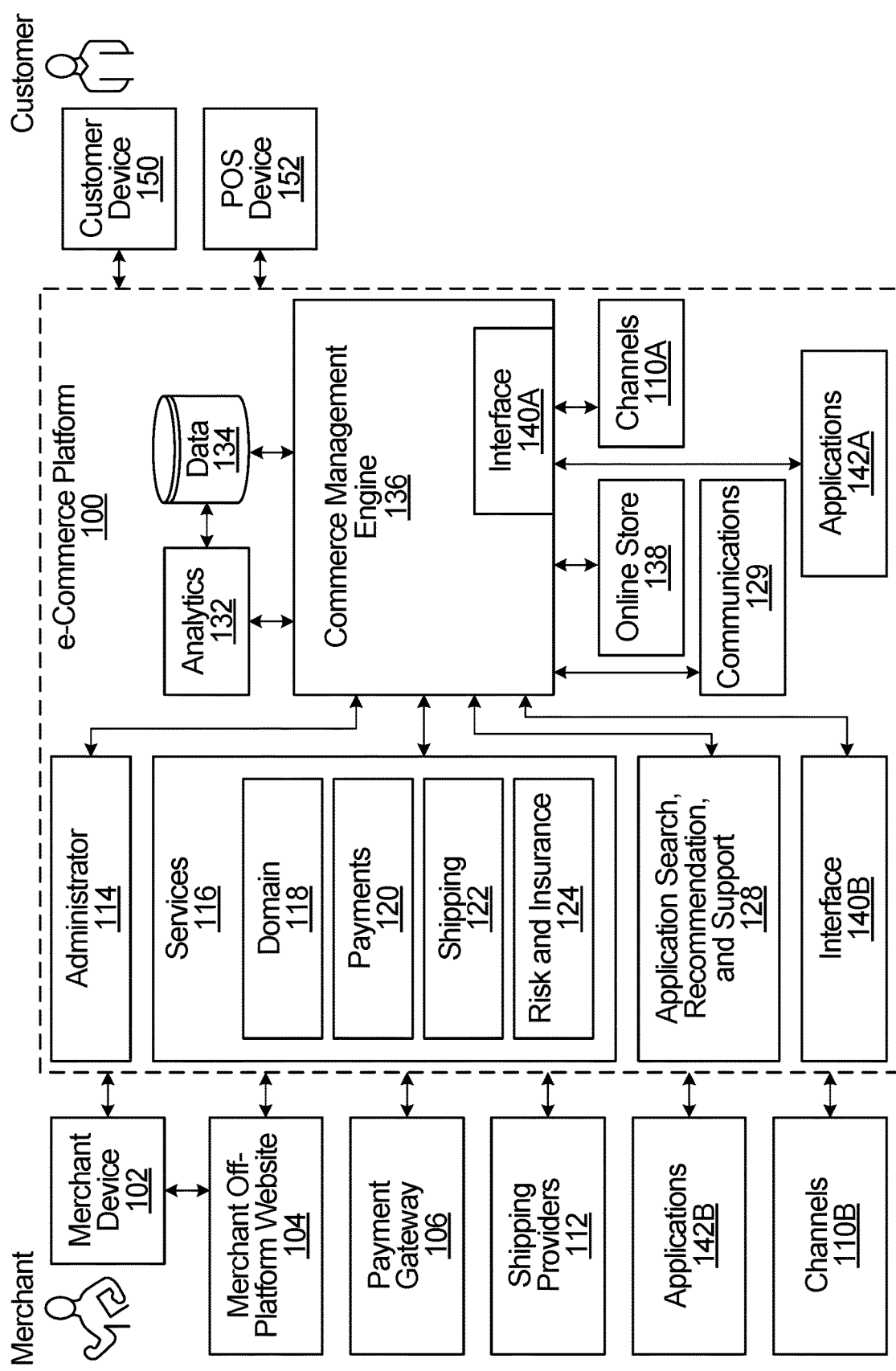
FIG. 1 is a block diagram of an e-commerce platform, according to one embodiment.

FIG. 1 illustrates an e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the platform 100. Merchants may utilize the e-commerce platform 100 for managing commerce with customers, such as by implementing an e-commerce experience with customers through an online store 138, through channels 110A-B, through POS devices 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform), and the like. However, even these 'other' merchant commerce facilities may be incorporated into the e-commerce platform, such as where POS devices 152 in a physical store of a merchant are linked into the e-commerce platform 100, where a merchant off-platform website 104 is tied into the e-commerce platform 100, such as through 'buy buttons' that link content from the merchant off platform website 104 to the online store 138, and the like.

The online store 138 may represent a multi-tenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In some embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In some embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In some embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In some embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The client device web browser (or other application) then renders the page accordingly.

In some embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the e-commerce platform 100, such as for storage by the system (e.g. as data 134). In some embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

FIG. 2 depicts a non-limiting embodiment for a home page of an administrator 114, which may show information about daily tasks, a store's recent activity, and the next steps a merchant can take to build their business. In some embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In some embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g. via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's back account (e.g., when using capital), and the like. These systems may have Sarbanes-Oxley Act (SOX) compliance and a high level of diligence required in their development and operation. The financial facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In some embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In some embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in some embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In some embodiments, an application 142A may be provided by the same party providing the platform 100 or by a different party. In some embodiments, an application 142B may be provided by the same party providing the platform 100 or by a different party. The commerce management engine 136 may be configured for flexibility and scalability through portioning (e.g., sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or noncritical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, rather than violating the isolation principle, it may be preferred to move these components out of the commerce management engine 136 and into their own infrastructure within the e-commerce platform 100.

In some embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through application search, recommendations, and support 128. In some embodiments, core products, core extension points, applications, and the administrator 114 may be developed to work together. For instance, application extension points may be built inside the administrator 114 so that core features may be extended by way of applications, which may deliver functionality to a merchant through the extension.

In some embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension/API 140A-B, help make products easy to view and purchase in a fast growing marketplace. In some embodiments, partners, application developers, internal applications facilities, and the like, may be provided with a software development kit (SDK), such as through creating a frame within the administrator 114 that sandboxes an application interface. In some embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time.

In some embodiments, the e-commerce platform 100 may provide application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In some embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In some embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In some embodiments, channels 110A-B may be modeled as applications 142A-B (a possible exception being the online store 138, which is integrated within the commerce management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In some embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In some embodiments, the payment gateway 106 may accept international payment, such as integrating with leading international credit card processors. The card server environment may include a card server application, card sink, hosted fields, and the like. This environment may act as the secure gatekeeper of the sensitive credit card information. In some embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represent an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In some embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that doesn't provide an API connection). An API fulfillment service may trigger a third party, where the third-party application creates a fulfillment record. A legacy fulfillment service may trigger a custom API call from the commerce management engine 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Implementation of Workflows Using an E-Commerce Platform

Figure 3:
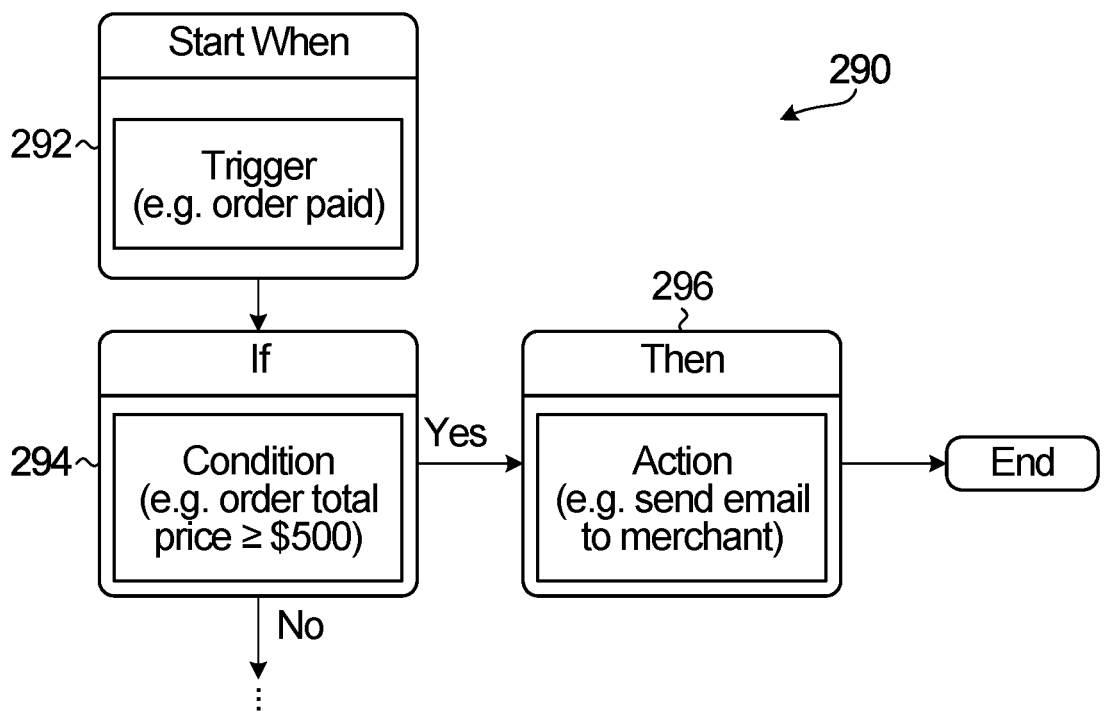
FIG. 3 illustrates an example of a general form of a workflow.

The e-commerce platform 100 may permit merchants to create workflows to automate tasks related to one or more online stores. An example of a general form of a workflow 290 is illustrated in FIG. 3. The workflow 290 includes a plurality of workflow steps executed by the e-commerce platform 100. The workflow steps include at least one trigger 292, at least one condition 294, and at least one action 296.

A trigger, e.g. trigger 292, is a change that occurs in relation to one or more online stores, and which causes the workflow to begin executing. Examples of triggers include: a new order; and/or a change in inventory; and/or a change in or addition of customer information; and/or a payment; etc. In some embodiments, the trigger may be from any one or a combination of online stores that belong to a merchant.

A condition, e.g. condition 294, is what is evaluated to determine whether an action is to be taken if the condition is met. A condition is generally a preposition that may be true or false, i.e. an if-then statement. Examples of conditions include: check if the inventory of a product is less than a certain value (e.g. inventory ≤5); and/or check if the amount of an order placed is over a designated value (e.g. order ≥$500); and/or check if the score of a new review is below a certain threshold (e.g. score=1 star); etc. A condition may contain one or multiple connectives, such as AND, OR, NOT, etc., e.g. if 'X' AND 'Y' then . . . , if 'X' OR 'Y' then . . . , etc. Depending upon whether the condition is met (e.g. whether the condition is 'true'), the workflow designates the next operation, which may be an action, another condition, or termination of the workflow process. In general, the workflow 290 may have multiple conditions, which may be assessed in parallel and/or in sequence. In general, trigger 292 may also be considered a condition.

An action, e.g. action 296, is a step executed in response to a particular condition being met. Examples of actions include: a notification to the merchant (e.g. send an email message to the merchant); and/or a communication with the merchant (e.g. send a message to the merchant asking a question, and acting based on the merchant's answer); and/or a change or addition to be made to memory in relation to the affected merchant (e.g. add customer data to the merchant's store A); and/or a message sent to an external party (e.g. send a re-stocking request); etc. The workflow 290 may have multiple actions that may be executed in parallel or in sequence. In some implementations, the action may be executed in direct response to the trigger, in which case trigger 292 in FIG. 3 incorporates condition 294.

Figure 4:
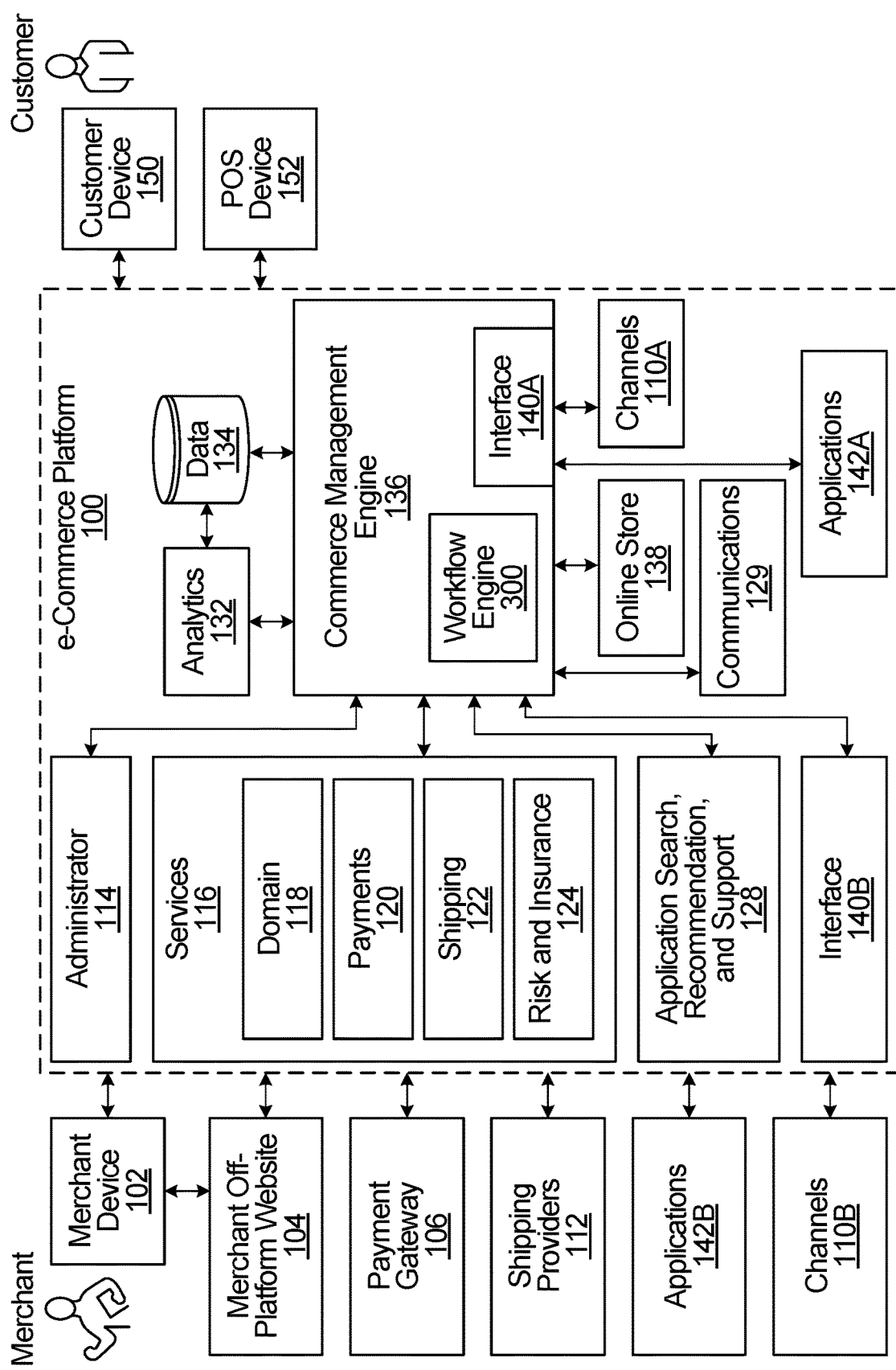
FIG. 4 illustrates the e-commerce platform of FIG. 1, but including a workflow engine.

FIG. 4 illustrates the e-commerce platform 100 of FIG. 1, but including a workflow engine 300. The workflow engine 300 is an example of a component in the e-commerce platform 100 for generating and executing workflows, such as the workflow 290 of FIG. 3. The workflow engine 300 may be associated with a single merchant or multiple merchants.

In some embodiments, the workflow engine 300 may be implemented by one or more processors that execute instructions stored in a memory. The instructions, when executed, cause the processor to perform the workflow operations described herein, e.g. building and storing workflows designed by a merchant, and subsequently executing those workflows. In other embodiments, the workflow engine 300 may be implemented using dedicated circuitry, such as a programmed field-programmable gate array (FPGA), a graphical processing unit (GPU), or an application-specific integrated circuit (ASIC).

Although the embodiments described below may be implemented by workflow engine 300 in e-commerce platform 100, the embodiments described below are not limited to the specific e-commerce platform 100 of FIGS. 1, 2, and 4. Therefore, the embodiments below will be described more generally in relation to any e-commerce platform.

Workflow Generation and Execution

Figure 5:
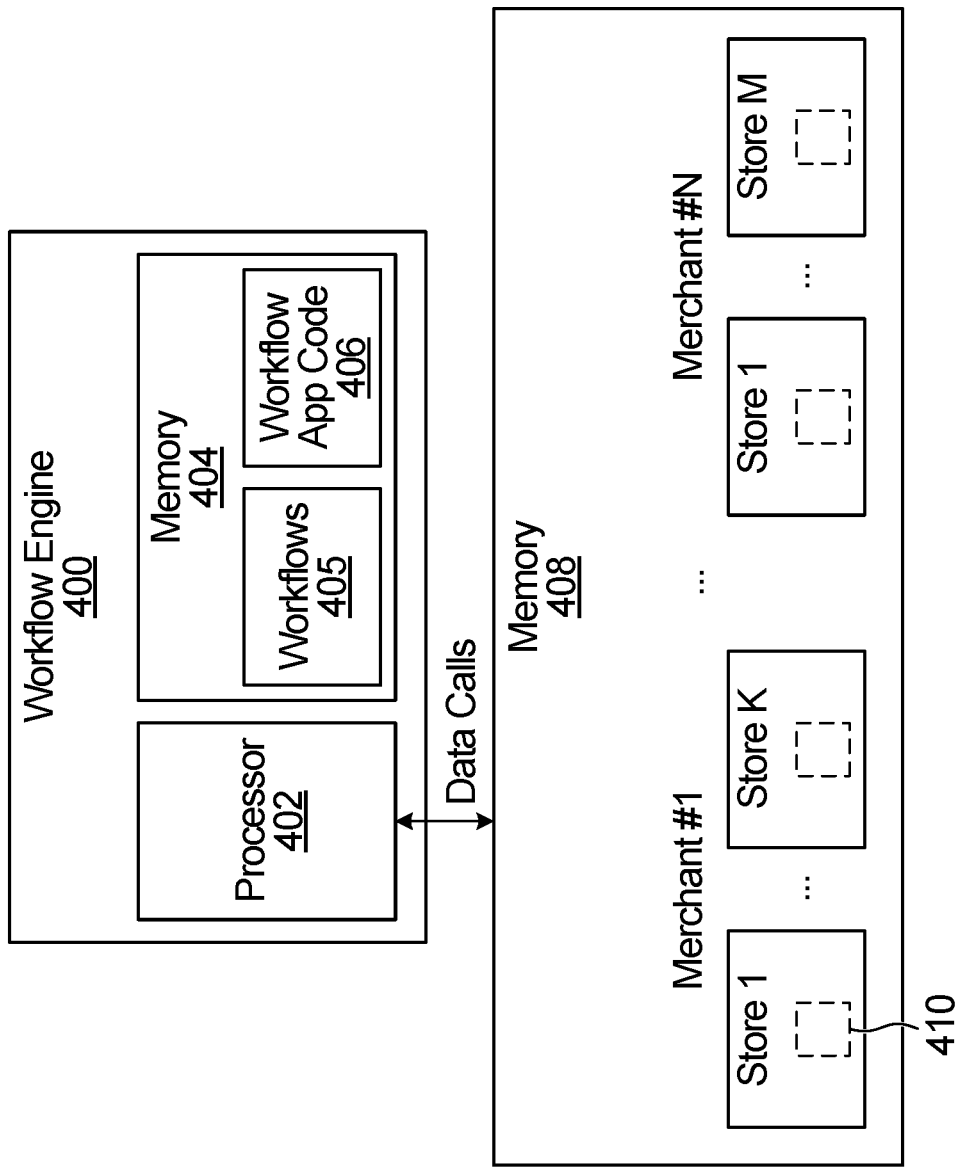
FIG. 5 illustrates a block diagram of a system for generating and executing workflows, according to one embodiment.

FIG. 5 illustrates a block diagram of a system for generating and executing workflows, according to one embodiment. The system includes a workflow engine 400. The workflow engine 400 may be workflow engine 300 in e-commerce platform 100, but more generally this need not be the case. The workflow engine 400 includes a memory 404 that stores, for each merchant, all existing workflows 405 corresponding to that merchant. Each workflow may be associated with one or multiple stores that belong to the merchant. The memory 404 further includes workflow application code 406 which, when executed, causes the workflow engine 400 to perform actions including: creating and storing new workflows based on instructions received from a merchant (via a merchant device), and executing workflows 405.

The workflow engine 400 further includes a processor 402 to execute the workflow application code 406. Therefore, processor 402 is implemented as one or more processors configured to execute instructions stored in a memory. Alternatively, some or all of the processor 402 may be implemented using dedicated circuitry, such as an FPGA, GPU, or an ASIC.

In operation, when one of the workflows 405 is executed by the processor 402, the execution of one or more steps of the workflow may require the processor 402 to retrieve online store data, i.e. information stored in association with one or more online stores belonging to the merchant. For example, such information may need to be evaluated to see if a condition is met. For example, if one of the workflow steps is the condition "Is the order greater than $500?", then the amount the customer paid for the order needs to be retrieved to evaluate this condition. Such information is stored in a separate memory 408, although it could be the case that memory 408 and memory 404 are one and the same.

The memory 408 stores merchant data and store data. Merchant data includes a unique ID associated with the merchant, and that is used by the system to distinguish between different merchants (e.g. Merchant #1, . . . , Merchant #N, etc.). The merchant's ID may be linked to each of the merchant's stores and each of the merchant's workflows. Merchant data may include additional information, such as online stores that belong to the merchant, company/store name, the merchant's personal information, etc. Store data includes a unique store ID associated with each online store (e.g. Store #1, Store #2, . . . etc.). Each store ID may also be associated with each merchant. Each store ID may additionally be associated with one or more workflows. Store data additionally includes information regarding the operation of the store, such as inventory, orders, products, payments, discounts, and customer data.

In the embodiment illustrated in FIG. 5, the memory 408 is specifically shown as storing information for N different merchants, each merchant having a plurality of stores that belong to the merchant (e.g. Merchant #1 has associated stores 1 to K, Merchant #N has associated stores 1 to M, etc.). Each store has a store ID (e.g. "Store 1", "Store 2", etc.), and each store has store data 410 associated therewith.

The workflow engine 400 may access merchant and store data stored in memory 408. Changes in the data stored in memory 408 may trigger or activate the workflow application code 406 in the memory 404. Following a trigger, the processor 402 may retrieve further data from the memory 408 to evaluate the conditions set out in the workflow executed by the workflow application code 406. Data may be retrieved by using one or more relevant store ID's to access the appropriate location in the memory 408. In some embodiments, store data 410 may be retrieved using an application programming interface (API) or query language executed by the processor 402. Data may be retrieved from multiple stores in parallel or in series. The workflow may execute one or more actions, e.g. based on a condition being met.

Figure 6:
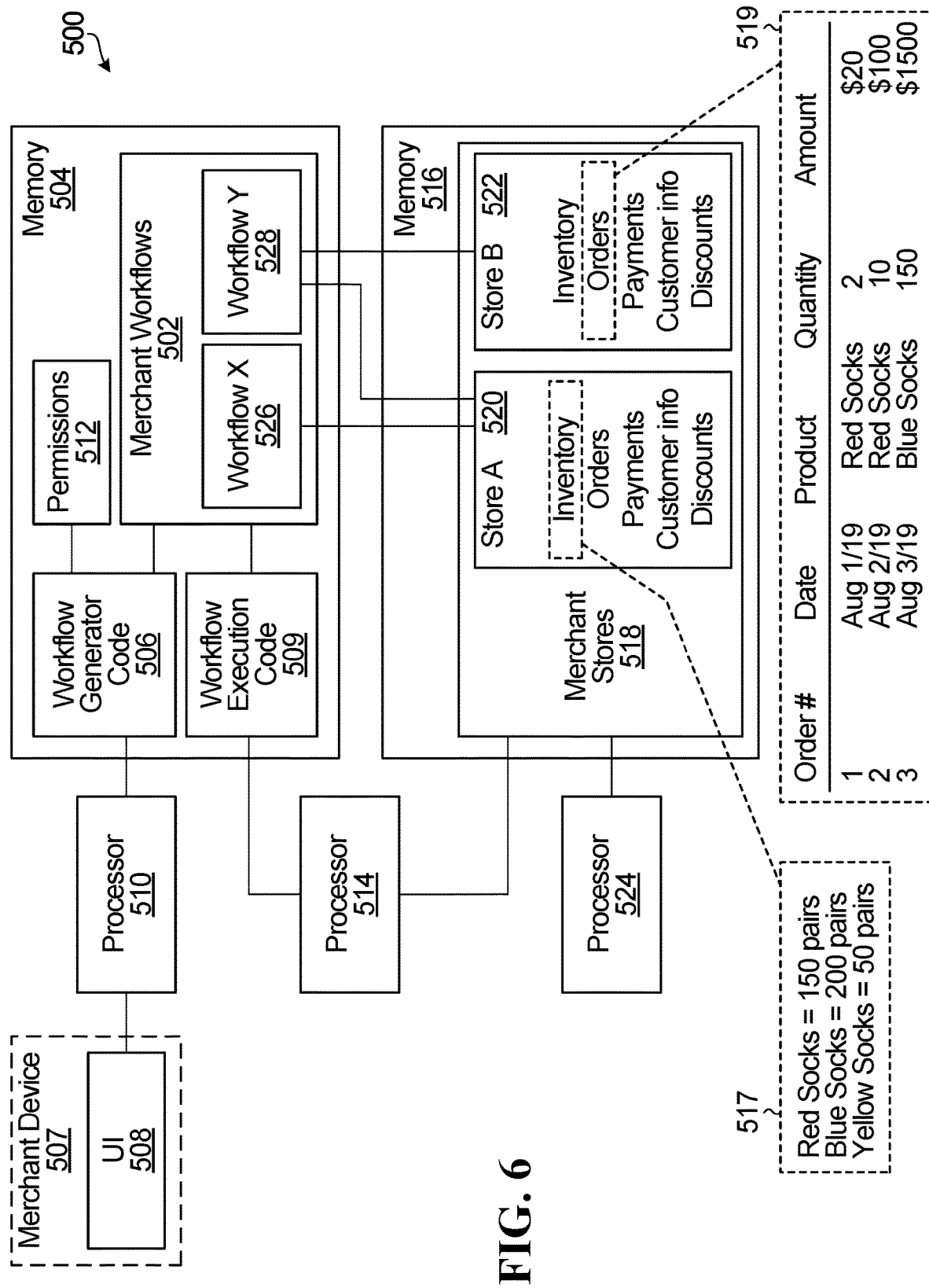
FIG. 6 illustrates a block diagram of a system for generating and executing workflows, according to another embodiment.

FIG. 6 illustrates a block diagram of a system 500 for generating and executing workflows, according to another embodiment. The system 500 in FIG. 6 operates similar to the system in FIG. 5, except more structural detail is illustrated in FIG. 6.

In FIG. 6, workflows are created using workflow generator code 506. Workflow generator code 506 is machine-executable code stored in memory 504 and executed by processor 510. Therefore, processor 510 is implemented as one or more processors configured to execute instructions stored in a memory. Alternatively, some or all of the processor 510 may instead be implemented using dedicated circuitry, such as an FPGA, a GPU, or an ASIC.

When the processor 510 executes the workflow generator code 506, it allows for the merchant to build a workflow in a modular manner. Each workflow consists of a plurality of workflow steps. The workflow steps include steps such as a trigger to trigger to workflow, one or more conditions, and one or more actions to take based on whether a condition is met (e.g. based on whether a condition evaluates as "true" or "false").

When the workflow generator code 506 is executed, the processor 510 instructs a user interface (UI) 508 to be presented to the merchant, e.g. by sending instructions to a merchant device 507, where the instructions cause the merchant device 507 to present the UI 508 on the merchant device 507. In some embodiments, the UI 508 may be implemented as a browser webpage or a UI in a native application or web application on the merchant device 507.

The UI 508 may present modular visual code blocks to the merchant, like in FIG. 3. The modular code blocks may be configured and customized to incorporate the desired triggers, conditions, and actions, to thereby build the workflow. Triggers and conditions in a workflow may be associated with one or more of the merchant's stores.

The processor 510 handles instructing of the UI 508, as well as generating and storing created workflows in memory 504. When a workflow is completed, it is stored within merchant workflows 502. For example, FIG. 6 illustrates two workflows generated by a merchant and stored in merchant workflows 502: Workflow X 526 and Workflow Y 528.

The memory 504 further stores permissions 512. The permissions 512 limit the types and variety of triggers, conditions, and/or actions available for generating a workflow. The processor 510 only allows for the creation of triggers, conditions, and/or actions that are available based on rules stored in the permissions 512. As an example, a particular user of the merchant's organization may only have permission to build workflows for a particular online store, and so the permissions 512 include rules that, when executed by the processor 510, present to that user the option to incorporate triggers, conditions, and/or actions relating only to the particular store, and not relating to other online stores that belong to the merchant. As another example, an application may be installed in an e-commerce platform in relation to a particular online store, and that application may generate events that can act as a trigger, e.g. the application may allow for an order to be generated, which may act as an external trigger. The permissions 512 include rules that, when executed by the processor 510, limit a trigger event from the application to only be associated with the online store in which the application is installed.

In some embodiments, a merchant may be associated with a specific merchant ID, and the merchant ID may be associated with a certain set of the permissions 512. The merchant ID may be used to locate and retrieve the permission information.

A stored workflow is executed using workflow execution code 509. Workflow execution code 509 is machine-executable code stored in memory 504 and executed by processor 514. Therefore, processor 514 is implemented as one or more processors configured to execute instructions stored in a memory. Alternatively, some or all of the processor 514 may instead be implemented using dedicated circuitry, such as an FPGA, a GPU, or an ASIC. In some embodiments, processors 510 and 514 may be the same processor. In some embodiments, workflow execution code 509 may be partially or fully written in a query language for efficient retrieval and processing of data, e.g. GraphQL™.

The processor 514 is responsible for executing workflows stored in the merchant workflows 502. It retrieves, processes, and potentially changes data on the memory 516 and/or memory 504 per the execution of a workflow.

Stored on the memory 516 is a group of merchant online stores 518. These stores are all owned by the same merchant and may be incorporated into that merchant's workflows. FIG. 6 illustrates two stores that belong to a merchant: store A 520, and store B 522. In general, a merchant may have any number of stores, including just one store or a large number of stores.

The merchant stores 518 contain data for store A 520 and store B 522. Store data includes information relating to the online store or operation of the online store, such as inventory, orders, products, payments, discounts, customer data, etc. Stippled bubble 517 illustrates an example of some store data stored in association with store A 520. Specifically, shown in stippled bubble 517 is an inventory count of each of the products sold on store A 520. The inventory count is adjusted by the e-commerce platform as inventory is received from suppliers and shipped to customers. Stippled bubble 519 illustrates an example of some store data stored in association with store B 522. Specifically, shown in stippled bubble 519 is a record of orders placed on store B 522. The order record includes information on the date of the order, the products chosen, the quantity of each product, and the amount of each order. The record is kept updated by the e-commerce platform as orders are placed.

The labels "store A" and "store B" may be nicknames set by the merchant, but which link to corresponding store IDs in memory (e.g. "store A" has ID #1). The merchant stores 518 may further store merchant data. Merchant data includes a unique ID associated with the merchant. The merchant's ID may be linked to that of the merchant's stores and may be linked to the merchant's configured workflows. Data for stores A and B include a unique store ID associated with each store. The store ID may be linked to that of the merchant. The store ID may additionally be associated with one or more workflows. For example, when a workflow for a merchant is stored in merchant workflows 502 in memory 504, the store ID is stored for each online store associated with each step of that workflow, so that the store ID can be used during execution of the workflow to retrieve data that is stored in association with that online store.

The system 500 further includes a processor 524 for monitoring the operations of stores A and B and processing and updating the relevant data on the memory 516. Examples of frequently updated information include inventory, orders, payments, discounts and customer data. Changes to the memory 516 may act as triggers for one or more workflows.

The processor 524 may be implemented by one or more processors that execute instructions and code stored in the memory 516 (or stored in another memory). Alternatively, some or all of the processor 524 may be implemented using dedicated circuitry, such as FPGA, GPU, or ASIC. The processor 524 may be the same as processor 510 and/or processor 514.

In operation, workflow X 526 is created using processor 510 and stored in merchant workflow 502 in association with a particular merchant (e.g. linked to the merchant via a merchant ID). Permissions 512 may restrict the steps of workflow X 526. The processor 514 then executes workflow X 526. The workflow X 526 includes a respective store ID for each online store associated with each step in the workflow. The store ID is used to retrieve information associated with that store as is needed for executing some or all of the steps of workflow X 526. For example, workflow X 526 in FIG. 6 is illustrated as being linked to store A 520, e.g. via the store ID for store A 520. Processor 524 updates information associated with store A, which may act as a trigger to begin executing workflow X. A similar process is performed for workflow Y 528 and any other workflows that belong to the merchant.

In the specific example in FIG. 6, workflow X 526 is dependent on triggers and conditions in the data from store A 520 only, whereas workflow Y 528 may be triggered by data from either or a combination of Stores A and B 520-522. Conditions for workflow Y 528 may be assessed using data from either or both stores.

Graphical User Interfaces (GUIs)

Figure 7:
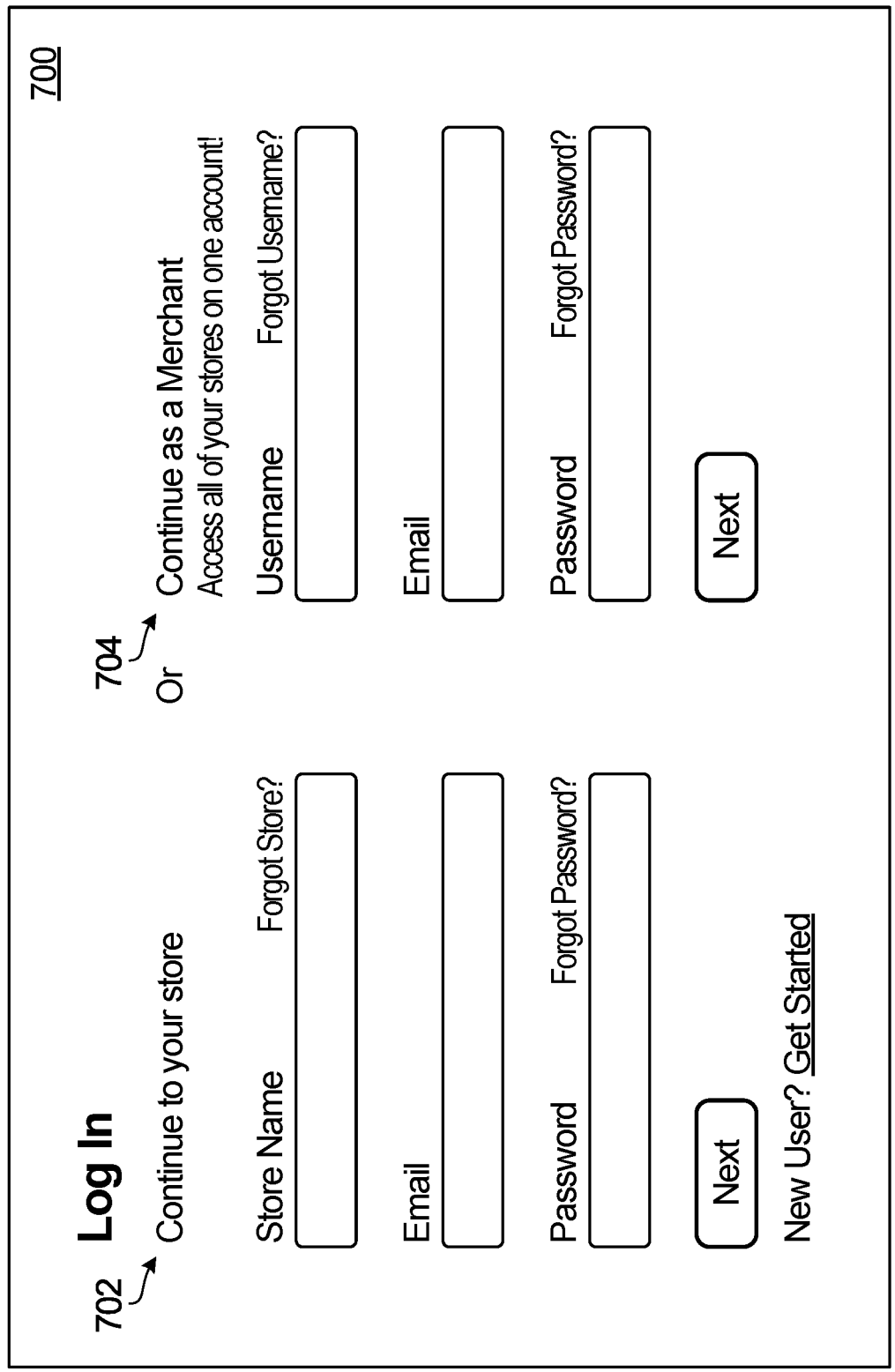
FIG. 7 is an example of a login screen that is presented to a merchant by an e-commerce platform.

FIG. 7 is an example of a login screen 700 that is presented to a merchant by an e-commerce platform. The login screen may be implemented as a part of the UI 508. The merchant has two choices. First, they may use a store login 702 to log into a specific online store using their credentials (e.g. store address, username, email, password) and manage that individual store. Second, the merchant has the option to instead use a merchant account login 704 to log into an organizational level account that manages the merchant's entire platform of stores. When logged into an organizational level account, the merchant may create and configure workflows that incorporate triggers, conditions, and actions from and across multiple stores in their platform.

Figure 8:
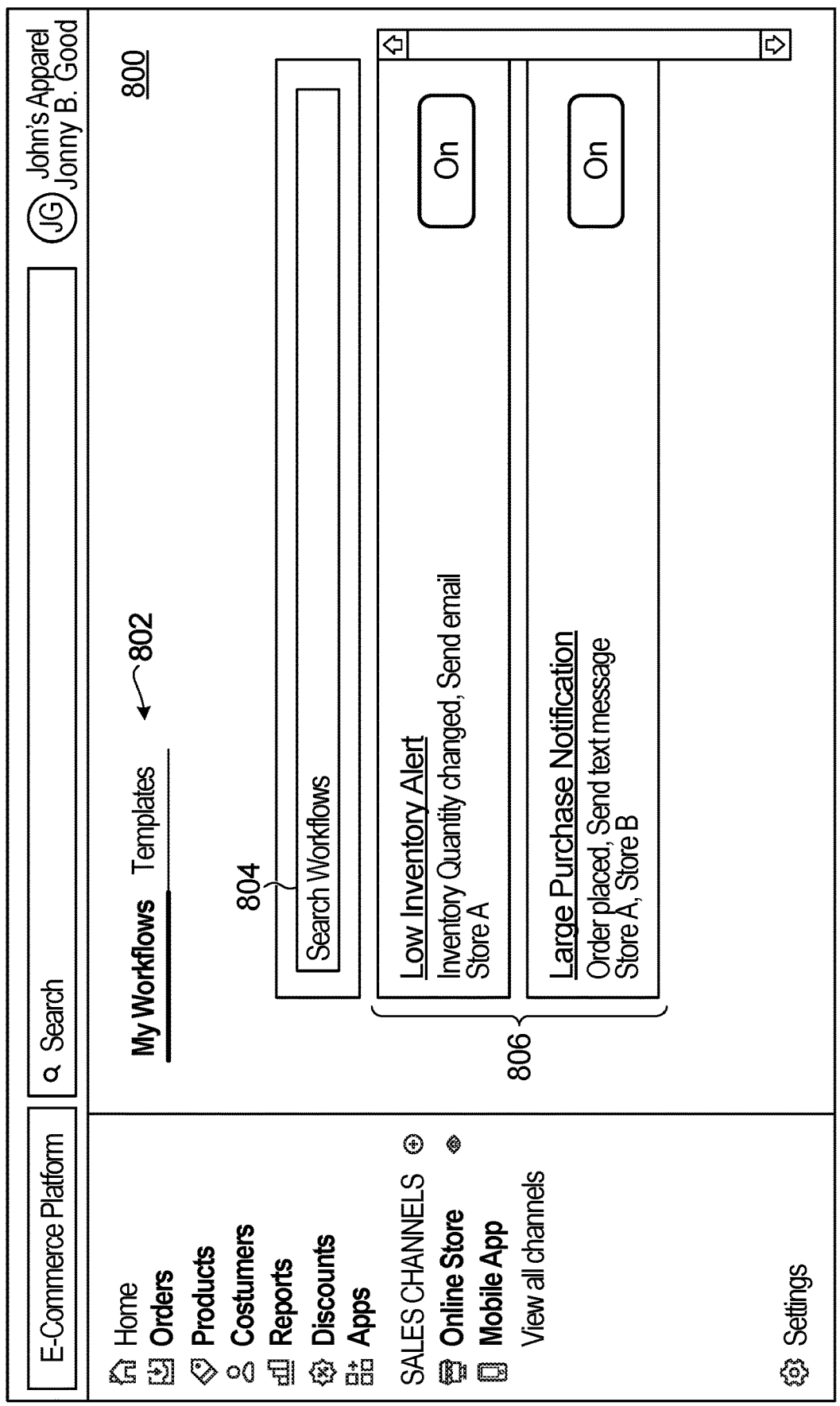
FIG. 8 illustrates an example user interface for organizing, accessing, and enabling workflows.

FIG. 8 illustrates an example user interface (UI) 800 for organizing, accessing, and enabling workflows. The UI 800 may be implemented on UI 508. The UI 800 includes an organizational toolbar 802 to organize the workflows. In the example organizational toolbar 802, "My Workflows" lists all the workflows that a merchant has configured for their one or more stores. The "Templates" selection allows a merchant to easily access example and template workflows. Templates may be either created by the merchant or provided by the e-commerce platform. The UI 800 further includes a search bar 804 to provide a means of searching through and filtering workflows. For example, the merchant may search for workflows by name, by a trigger, condition, or action, or by a specific store.

The UI 800 also includes an example workflow summary 806. The workflow summary 806 includes a list of workflows. Each entry in the list corresponds to a respective workflow and lists information related to that workflow, such as the name the merchant has given the workflow, the general overview of the triggers and/or conditions and/or actions that the workflow may take, and the merchant's online stores that currently utilize or relate to the workflow. The merchant may also toggle the workflow on or off, activating or deactivating the workflow for all stores included in the workflow.

Figure 9:
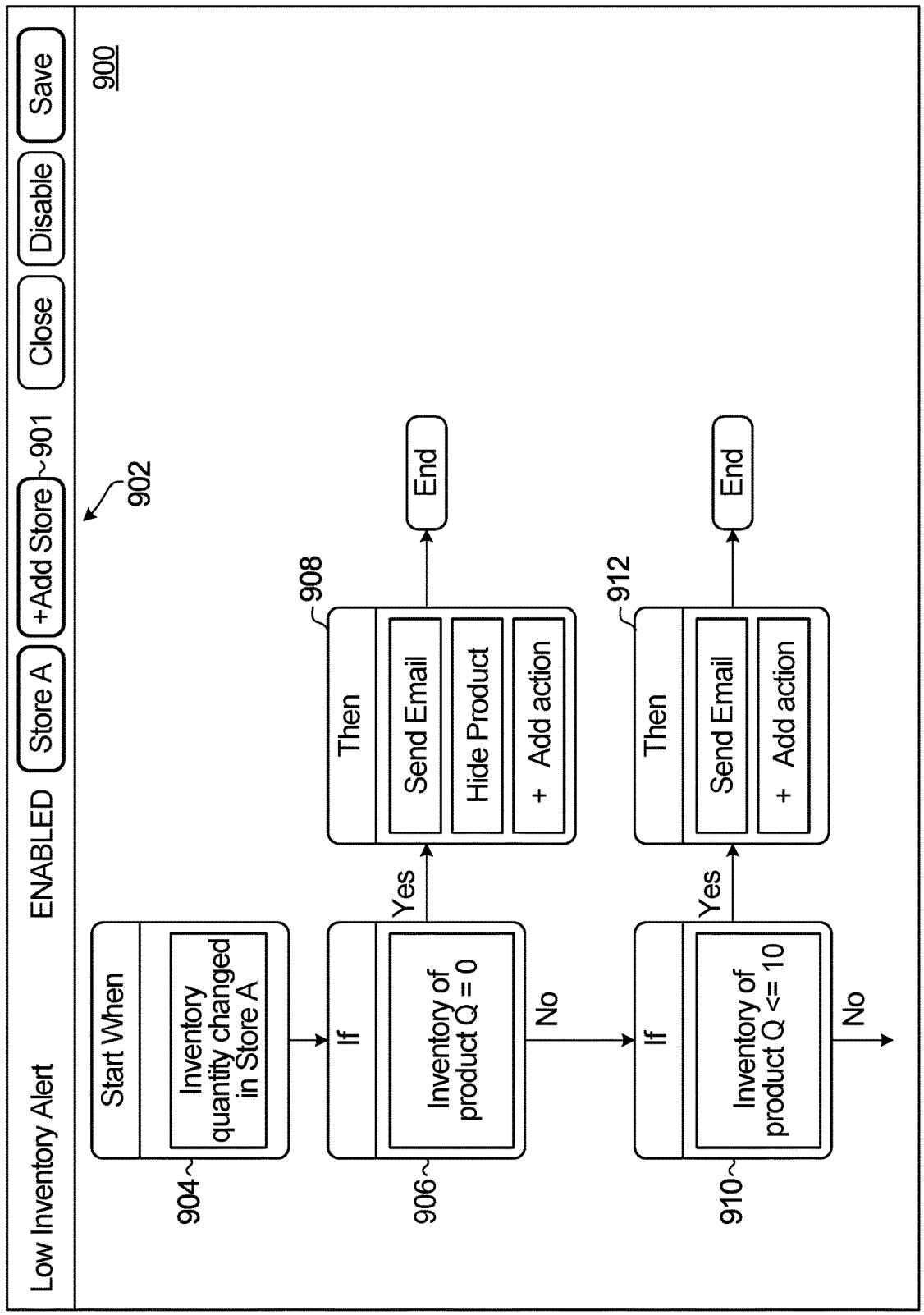
FIG. 9 illustrates a user interface for creating and editing workflows, according to one embodiment.

FIG. 9 illustrates a UI 900 for creating and editing workflows, according to one embodiment. The UI 900 may be implemented on UI 508. The UI 900 utilizes simple block diagrams and drag-and-drop mechanisms to assist merchants to configure or build a workflow without the need to edit code directly. As discussed earlier, the processor 510 of FIG. 6 may execute the workflow generator code 506 to enable the merchant to configure and build workflows, e.g. by sending instructions to, and receiving instructions from, the merchant device 507. The UI 900 of FIG. 9 includes a header 902 having options for closing, modifying and saving the displayed workflow. The header 902 also displays whether the workflow is currently active and able to be triggered, and the stores included in the workflow. The merchant may add a new store to the workflow, as shown at 901, which may enable options including triggers, condition, and actions related to the new store. In an alternative implementation, the merchant may input a trigger, condition, or action related to another store, which automatically adds the store to the list in the header 902. In the example given in FIG. 9, only Store A is included in the workflow.

The UI 900 illustrates an example workflow including an example trigger 904, two example conditions 906 and 910, and two example actions 908 and 912. The trigger 904 activates when an inventory quantity change is detected in Store A. This inventory quantity change may encompass all offered products, or a specific product may be designated. Following the trigger 904, the workflow evaluates the example condition 906 using the information stored in the memory relating to Store A. The condition 906 evaluated is whether the inventory change of trigger 902 has resulted in the inventory quantity of a certain product Q to drop to zero. If the quantity is zero, then the condition is met ("Yes") and example action 908 is executed: send an email to the merchant and hide the product from view in online store A. Following the execution of the action 908, the workflow terminates until another change in inventory activates the trigger 904.

Returning to condition 906, if the result is that the inventory of Product Q is still greater than zero, secondary condition 910 is assessed to determine if the inventory is below another threshold (Q≤10). If the condition 910 is met, then action 912 is executed (send email to merchant) and the workflow terminates until another change in inventory activates the trigger 904.

A merchant may further configure the trigger 904, the conditions 906/910, and/or the actions 908/912 by selecting them using the UI 900 and entering more information. Example further details may include: specifying the text and recipient of the email in the action 908 or specifying the product or threshold number in the condition 906.

Figure 10:
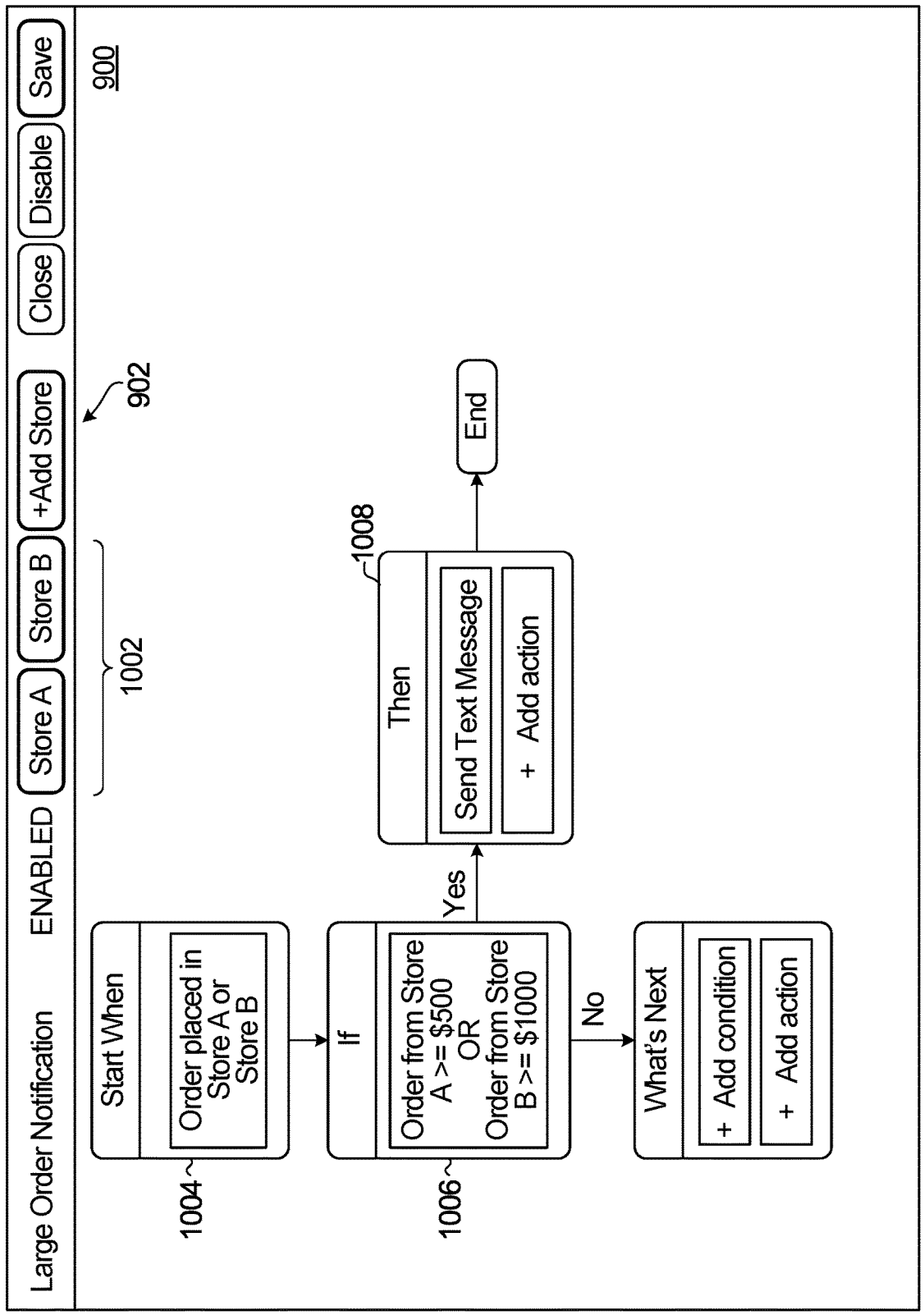
FIG. 10 illustrates an example of a different workflow built by the merchant on the user interface.

FIG. 10 illustrates an example of a different workflow built by the merchant on the UI 900. Unlike the workflow illustrated in FIG. 9, the example workflow in FIG. 10 includes triggers and conditions related to multiple stores: Store A and Store B. The header 902 indicates that the workflow includes triggers and conditions from both Store A and Store B, as shown at 1002.

The workflow illustrated in FIG. 10 includes an example trigger 1004, an example condition 1006, and an example action 1008. The trigger 1004 is activated when a change in the memory indicates that an order has been placed in either Store A or Store B. Following the trigger 1004, the workflow assesses example condition 1006. Condition 1006 has two clauses joined by a logical "OR", indicating that if either of the clauses is evaluated to be true, the condition is true. The condition does not trigger multiple instances of the resulting actions if both clauses are true. In this example condition 1006, the information from Store A and Store B is evaluated to determine the result of the condition. If the order that activated the trigger 1004 was placed in Store A, the condition evaluates whether the order was greater than or equal to $500 in value. If the order was placed in Store B, the condition evaluates whether the order was greater than or equal to $1000 in value. If the condition is met ("Yes"), the workflow continues to action 1008. Otherwise, the workflow ends and the process is terminated. The merchant has the option of inserting one or more secondary conditions or alternate actions in the case that the condition is evaluated as false.

Action 1008 results in the e-commerce platform automatically sending a text message notification to the merchant to indicate that they have received a large order in one of their stores. The merchant may be able to configure the text message to include which store the order originated from, what the items in the order included, and/or the total amount of the order. After the action is performed, the workflow is terminated until another order is placed in Store A or Store B, reactivating the trigger 1004.

Execution of the workflow illustrated in FIG. 10 will now be described with reference to FIG. 6, and in particular assuming that the workflow in FIG. 10 is workflow Y 528 in FIG. 6, and that Store A and Store B in FIG. 10 are Store A 520 and Store B 522 in FIG. 6.

The workflow is created by processor 510 executing workflow generator code 506. The UI 900 of FIG. 10 is the UI 508 of merchant device 507, which is generated by the processor 510 sending instructions to the merchant device 507 to present the UI 900. When the workflow is saved in memory 504, the Merchant ID associated with the merchant and the store IDs associated with the Store A 520 and Store B 522 are stored with the workflow. The workflow is subsequently executed by processor 514 executing workflow execution code 509. During execution, the workflow is triggered by receipt of a new order from Store A or Store B. For example, the workflow may be triggered by a new order being received for Store B, which is reflected by an addition to record 519 of FIG. 6. For example, in response to an indication of order 3 being added to the order record 519 of Store B, the workflow is triggered. Using the store ID associated with the store B 522, the workflow locates and retrieves the entry for order 3 in the memory 516. The amount of the order is read ($1500) and is evaluated against the condition 1006. Since the condition is met ($1500>=$1000) the workflow follows the "YES" pathway to the action 1008. The workflow initiates a text message to the merchant to indicate that they have received a large order. Having reached the "END", the workflow finishes and the process is terminated. The workflow may be triggered again whenever an order is received for Store A or Store B.

In some embodiments, workflow triggers are detected by monitoring the events flow in the relevant databases, e.g. in memory 516. As an example, an order creation will generate a new object in a store, which may trigger any flow related to the creation of a new order. In some embodiments, the changing of a state/value of a particular field in the database (e.g. in memory 516) may also or instead be used to trigger a workflow. In some embodiments, a notification of a particular event in a store (e.g. the placement of an order) may be automatically transmitted to the workflow system (e.g. to processor 514 or 402), which causes the workflow system to check whether a trigger relating to the notified event has occurred.

Figure 11:
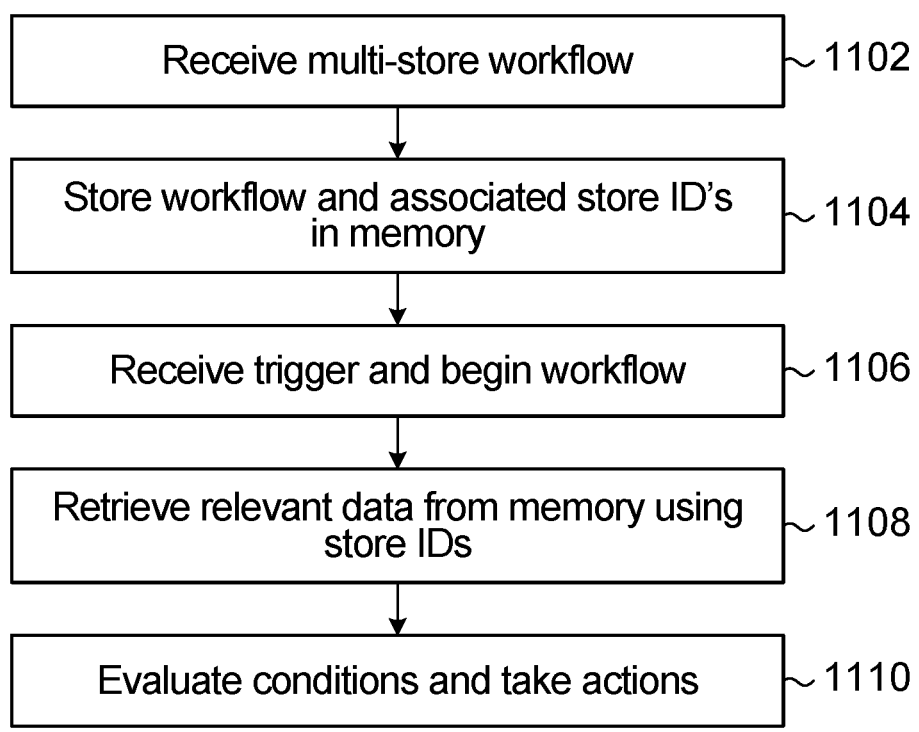
FIG. 11 illustrates a method for generating and executing a workflow, according to one embodiment.

FIG. 11 illustrates a method for generating and executing a workflow, according to one embodiment. At step 1102, the processor 510 receives a workflow configuration from the UI 508, including one or more triggers, conditions, and/or actions to be taken. The configuration includes triggers, conditions, and/or actions corresponding to multiple stores.

At step 1104, the workflow is stored in the memory 504 as an entry on the merchant workflows 502. The saved workflow includes one or more Store IDs corresponding to the stores associated with the triggers, conditions, and/or actions configured in the workflow. The workflow may optionally include a merchant ID corresponding to the merchant that created the workflow.

The processor 514 subsequently executes the workflow. At step 1106, the processor 514 receives a trigger to begin the workflow, e.g. due to a change in store data relating a relevant store. The workflow reads the configured conditions and determines the data to be retrieved. At step 1108, the workflow uses the one or more Store IDs saved with the workflow to locate the corresponding online store on the memory 516 and retrieve the relevant data. At step 1110, one or more conditions are evaluated on the basis of the data retrieved, and the resulting one or more actions are taken. The workflow is then ended and the process is terminated. At any point, a new change in store data relating to one or more of the relevant stores may cause a new instance of the workflow to be triggered, repeating steps 1106-1110.

Additional Embodiments

In some embodiments, when a workflow is being built by a merchant under a specific store, then the system (e.g.

processor 510 of FIG. 6) can prompt the merchant and ask whether the merchant wants to make the workflow global across all or a subset of their stores. If so, the system can automatically change the triggers and conditions to apply to all stores of interest. For example, in FIG. 9, upon saving the flow, the merchant may be prompted as to whether the merchant would also like the workflow to apply to Store B. If the merchant indicates 'Yes' via the user interface, then the workflow is automatically created (e.g. repeated) for Store B, or modified to incorporate store B.

Figure 12:
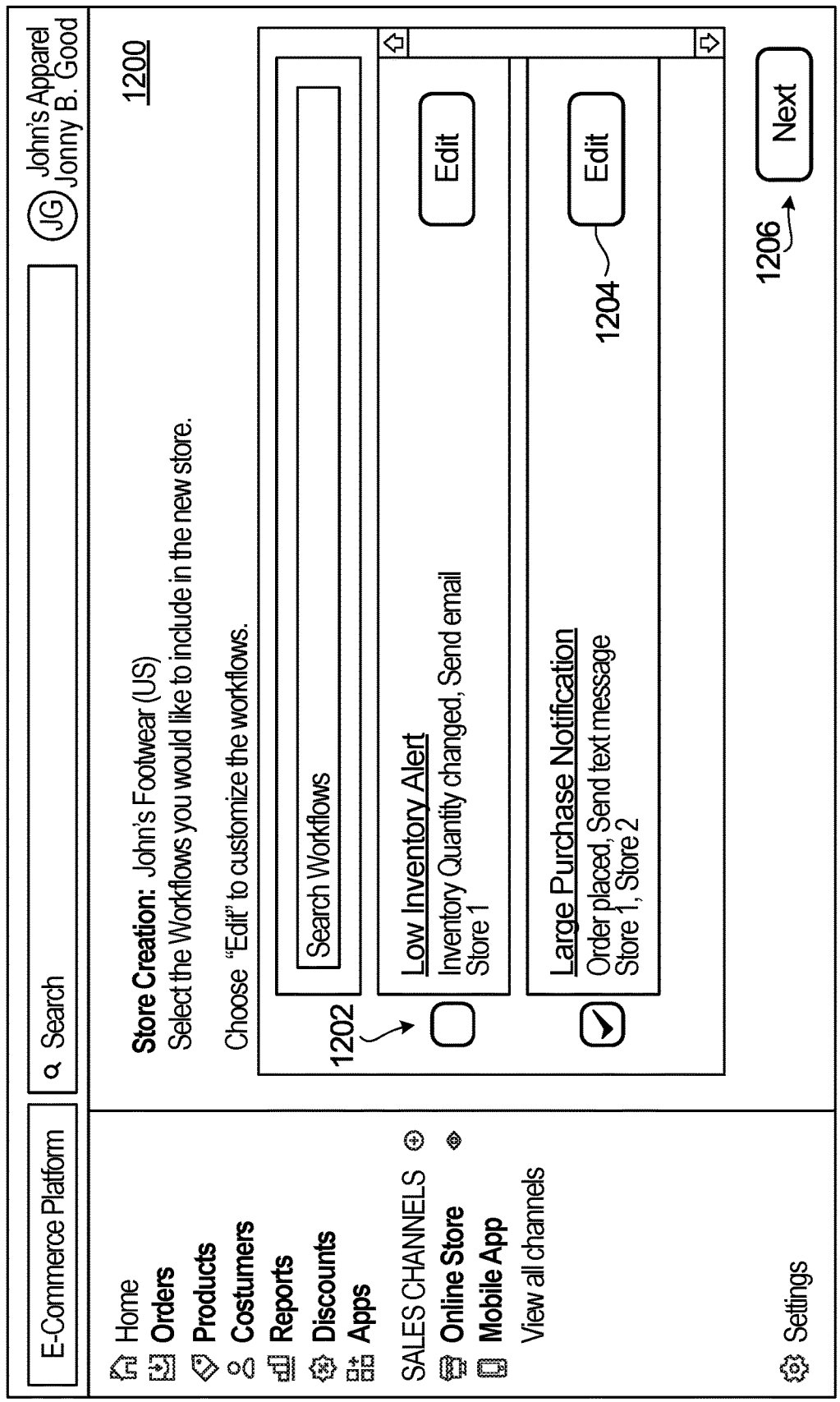
FIG. 12 is an example screen page for choosing workflows to include as part of the creation of a new store.

In some embodiments, the merchant may create an additional online store that falls under the umbrella of their organizational-level account. For example, the merchant may have a U.S./global online store, but may decide to create a Canada-specific store due to the large number of orders being consistently received from customers in Canada. Upon creating the additional online store, the merchant may wish for a simple way to include or incorporate their previously created workflows into the new store. FIG. 12 illustrates an example UI 1200, which may be implemented on UI 508, and is for incorporating previously created workflows into a new store. On the UI 1200, the merchant has the choice of selecting/checking the boxes 1202 next to the workflows to include in the new store. In addition, the UI 1200 allows the merchant to select an "edit" input object (e.g. button 1204) to enter an editing UI or overlay (such as the UIs in FIGS. 9-10) to customize and incorporate the workflow to include triggers, conditions, and/or actions related to the new store. The merchant may then exit the editing UI and resume the addition and setup of the new store. The "Next" button 1206 links to other portions of the store setup.

General Methods

Figure 13:
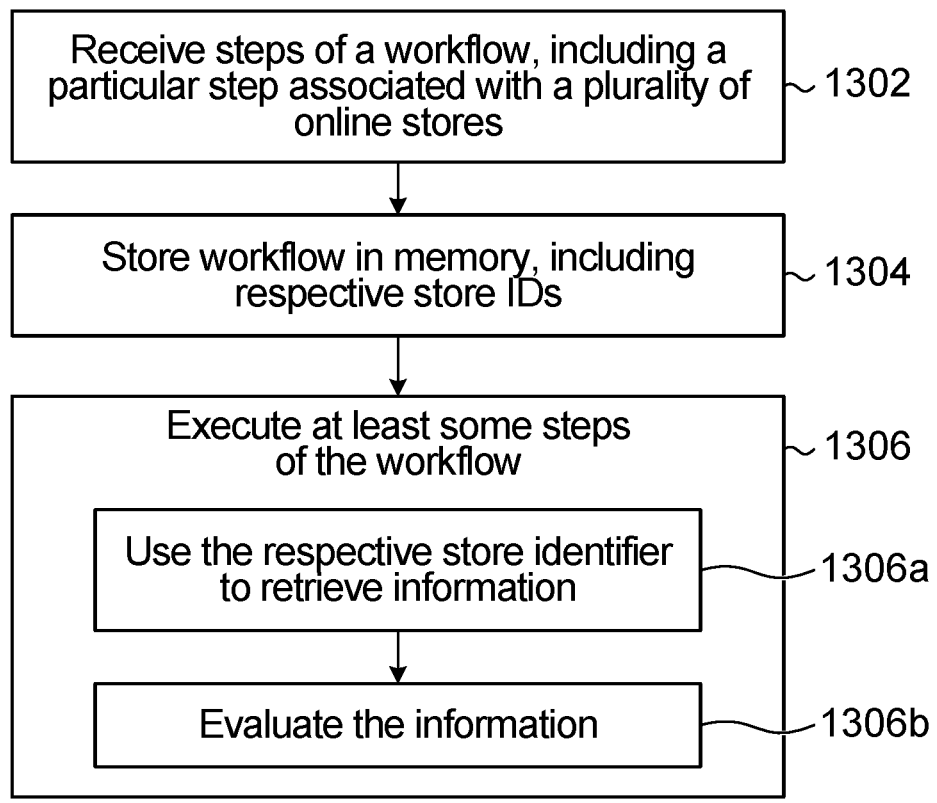
FIG. 13 illustrates a computer-implemented method, according to one embodiment.

FIG. 13 illustrates a computer-implemented method, according to one embodiment. The method may be performed by a computing device (e.g. a processor or combination of processors such as the processors 510 and 514). In some embodiments, the method may be implemented in an e-commerce platform (e.g. by the workflow engine 300 or 400). Specifically, the computer-implemented method is a method for workflows across multiple stores.

At step 1302, an indication of a plurality of steps of a workflow is received from a merchant or merchant device (e.g. from merchant device 507 of FIG. 6). The indication may be received by a processor in the e-commerce platform (e.g. processor 510 of FIG. 6). The processor may receive and read a computer-readable message that includes the indication. The plurality of steps of the workflow may have been configured by the merchant using a graphical user interface (e.g. the UI 508 on merchant device 507), and then that configuration transmitted to the processor of the e-commerce platform. The plurality of steps of the workflow may include one or more triggers to trigger the workflow (e.g. trigger 1004 of FIG. 10), one or more conditions to evaluate (e.g. condition 1006 of FIG. 10), and one or more actions to be taken if the condition is met (e.g. action 1008 of FIG. 10). At least one particular step of the plurality of steps is associated with a plurality of online stores that belong to the merchant (e.g. in FIG. 10 condition 1006 is associated with both store A 520 and store B 522).

At step 1304, the workflow is stored in memory, including storing a respective store identifier for each online store associated with the particular step. Each store identifier corresponds to a respective online store. Each online store has information stored in memory in association with the online store. Examples of information stored in memory for an online store include the information illustrated in boxes 517 and 519 of FIG. 6. The store identifier allows the processor executing the workflow to locate and retrieve information associated with that online store, e.g. by the processor sending a request to memory, the request including the store identifier and possibly including an indication of the data to be retrieved from memory in association with that store ID. A merchant identifier, corresponding to the merchant who created/configured the flow may also be stored with the workflow.

At step 1306, at least some of the plurality of steps of the workflow are subsequently executed, including the particular step associated with the plurality of online stores. In some embodiments, the workflow may be executed in response to a change in memory activating a trigger (e.g. a new order activating trigger 1004 in FIG. 10). The workflow begins executing and reaches a step in which retrieval of further information is required. The step may be the particular step associated with the plurality of online stores. For example, the particular step may be step 1006 of FIG. 10. To evaluate the condition in step 1006 of FIG. 10, further information regarding the relevant order is required and must be retrieved from memory.

Executing the workflow steps in step 1306 includes executing the particular step associated with the plurality of online stores. Executing the particular step includes substeps 1306*a* and 1306*b*. In substep 1306*a*, for at least one online store associated with the particular step, the respective store ID for the online store is used to retrieve information stored in association with the online store. In substep 1306*b*, the information is evaluated as part of executing the particular step. In some embodiments, to assist in data retrieval, an API and/or a query language may be utilized. In some embodiments, the data of a plurality of online stores may be retrieved in series or in parallel.

The information evaluated in substep 1306*b* may be evaluated in different ways, depending upon the implementation. For example, evaluating the information may include: comparing the information against a threshold; and/or comparing the information to that of another online store; and/or comparing the information to a classification or value; etc. The comparisons may be performed by a processor in the e-commerce platform.

As an example, the particular step associated with the plurality of online stores may be step 1006 in FIG. 10. Step 1006 is a condition that is associated with two stores that belong to the merchant: store A and store B. To evaluate the condition 1006, the amount of the relevant order must be retrieved and compared against a threshold value that differs depending on the store from which the order originated. Once the information is evaluated, multiple pathways of workflow execution may be selected from for the remainder of the workflow, depending on the result of the evaluation.

In some embodiments, the plurality of steps of the workflow may be all of the steps of the workflow, or may be certain steps of the workflow executed as a result of the evaluations of previous steps of the workflow.

In some embodiments, multiple steps of the workflow are each associated with more than one online store that belongs to the merchant. For example, the workflow shown in FIG. 10 includes multiple steps, of which step 1004 (the trigger) and step 1006 (the condition) are each associated with more than one online store. In FIG. 10, these two steps are each associated with the same two stores: store A and store B.

In some embodiments, the particular step of the workflow comprises a particular condition associated with at least one of the plurality of online stores belonging to the merchant. Executing the particular step may include: for at least one online store associated with the particular condition: using the respective store identifier for the online store to retrieve the information stored in association with the online store, and using the information to determine whether the particular condition is true or false. In some embodiments, if the particular condition is true, then a particular action or workflow step may be taken. In some embodiments, if the particular condition is false, then another action or workflow step may be taken. By way of example, step 1006 in FIG. 10 is a condition associated with two online stores that belong to the merchant: store A and store B. For one of those online stores (depending on the store in which the order was placed) the store ID for that store is used to retrieve the order information from memory for that store, e.g. by a processor in the e-commerce platform performing an API call or database query. The order information includes order amount in dollars, which is used by the processor to evaluate the condition. Evaluating the condition may be implemented by the processor comparing the information to a threshold that is stored in association with the workflow (e.g. for store A the information may include dollar amount of the order, and evaluating the condition includes comparing whether the dollar amount is equal to or greater than $500). In some embodiments, if an API request is used to retrieve the information stored in association with the online store, then the API request may use the store identifier and an indication of the information in order to retrieve the information.

In some embodiments, the method of FIG. 13 may include instructing a merchant device to present a graphical user interface on the merchant device. The instructing may be performed by a processor in the e-commerce platform transmitting a message to the merchant device, the message including instructions that, when executed by a processor in the merchant device, cause the merchant device to present the graphical user interface on the display of the merchant device. In some embodiments, the graphical user interface includes one or more selectable objects that, when selected by the merchant, generate the indication of the plurality of steps of the workflow. The indication may then be transmitted from the merchant device back to the e-commerce platform. One example of a graphical user interface is illustrated in FIG. 10. The boxes corresponding to 1004, 1006, and 1008, are each selectable objects that are used by the merchant to indicate steps of the workflow. For example, the merchant may select the box corresponding to 1006 to enter (indicate) the specific condition that is to be executed.

In some embodiments, the graphical user interface further includes at least one selectable object that, when selected by the merchant, instructs configuration of different ones of the plurality of online stores that belong to the merchant. For example, such a graphical user interface may be instructed for presentation on the merchant device upon the e-commerce platform receiving organizational-level login credentials from a merchant (e.g. submitted by the merchant via portion 704 of the UI 700 FIG. 7). The configuration of the different ones of the plurality of online stores may include changing settings on one or multiple of the merchant's online stores, all via a single user interface. In some embodiments, the method may include receiving login credentials from the merchant device (e.g. which were provided by the merchant via a UI, such as via portion 704 of the UI 700 of FIG. 7), and in response to receiving the login credentials: instructing the merchant device to present the graphical user interface.

In some embodiments, the method of FIG. 13 may include using a merchant identifier belonging to the merchant to retrieve merchant permissions associated with the merchant. For example, processor 510 in the embodiment of FIG. 6 may use the merchant identifier to query permissions 512 for the merchant (e.g. retrieve the relevant permissions from memory using the merchant identifier). Based on the merchant permissions, the e-commerce platform may instruct the merchant device to present, on the graphical user interface, a subset of possible selectable objects to limit the plurality of steps of the workflow that can be indicated by the merchant. The e-commerce platform may instruct the merchant device by sending a message to the merchant device that, when executed by a processor of the merchant device, causes the merchant device to present the subset of possible selectable objects. For example, if the user building the workflow in FIG. 9 was not permitted to incorporate store B into the workflow, then adding triggers, conditions, and actions associated with store B would not be presented as an available option to the user.

In some embodiments, each online store of the plurality of online stores that belong to the merchant has its own unique domain or subdomain. In some embodiments, each online store of the plurality of online stores that belong to the merchant has its own respective inventory and orders.

In some embodiments, storing the workflow in memory further includes storing a merchant identifier that identifies that the workflow is associated with the merchant.

CONCLUSION

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions, and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor-readable storage medium or media for storage of information, such as computer/processor-readable instructions, data structures, program modules, and/or other data. A non-exhaustive list of examples of non-transitory computer/processor-readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and nonvolatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor-readable storage media.

The invention claimed is:

1. A computer-implemented method comprising:
instructing a merchant device to present a graphical user interface on the merchant device;
receiving, from the merchant device, a first input via the graphical user interface, the first input including merchant login information, and in response updating the graphical user interface to permit a merchant to create computer-implemented automated workflows specific to two or more of a plurality of online stores that belong to the merchant, each of the plurality of online stores having a respective different domain or subdomain associated with a corresponding website;
receiving, from the merchant device, a second input via the graphical user interface, the second input instructing creation of a new single computer-implemented automated workflow specific to each one of multiple online stores of the plurality of online stores and that applies to each one of the multiple online stores, the second input including an indication of a plurality of steps of the computer-implemented automated workflow, the plurality of steps including a trigger that triggers the computer-implemented automated workflow, wherein the trigger is in response to a change that occurs in relation to any one of the multiple online stores of the plurality of online stores; the plurality of steps of the computer-implemented automated workflow further including a condition, and an action to be taken by a computer if the condition is met, wherein the condition of the computer-implemented automated workflow is across the multiple online stores of the plurality of online stores and is therefore associated with at least two of the plurality of online stores that belong to the merchant, and wherein the condition includes at least two clauses joined by logical OR, each clause corresponding to a respective different one of the multiple online stores, wherein the workflow is configured to trigger only one instance of the action in response to the condition being satisfied;
storing the computer-implemented automated workflow in memory, including storing a respective store identifier for each online store associated with the condition;
instructing the graphical user interface to display, on the merchant device, an indication of the created computer-implemented automated workflow;
receiving, from the merchant device, a third input via the graphical user interface, the third input instructing activation of the computer-implemented automated workflow for the multiple online stores, the graphical user interface permitting toggling between activation and deactivation of the computer-implemented automated workflow;
subsequent to activation of the computer-implemented automated workflow, executing the computer-implemented automated workflow, the executing including:
in response to the trigger occurring in relation to any one of the multiple online stores, executing at least some of the plurality of steps of the computer-implemented automated workflow, including executing the condition and implementing the one instance of the action;
wherein executing the condition includes evaluating at least one of the at least two clauses joined by the logical OR, each clause corresponding to a respective different one of the multiple online stores, and for at least one online store associated with the condition: using the respective store identifier for the online store to retrieve information stored in association with the online store, and evaluating the information as part of executing the condition; and
wherein implementing the one instance of the action includes automatically causing the action to be performed in response to the condition being satisfied for a single one of the multiple online stores.

2. The computer-implemented method of claim 1, wherein multiple steps of the computer-implemented automated workflow are each associated with more than one online store that belongs to the merchant.

3. The computer-implemented method of claim 1, wherein evaluating the information as part of executing the condition comprises using the information to determine whether the condition is true or false.

4. The computer-implemented method of claim 3, wherein using the respective store identifier for the online store to retrieve the information stored in association with the online store comprises: performing an application program interface (API) request, the API request using the respective store identifier and an indication of the information.

5. The computer-implemented method of claim 3, further comprising: if the condition is true, then performing a particular action.

6. The computer-implemented method of claim 1, wherein the graphical user interface further includes one or more selectable objects that, when selected by the merchant, generate the indication of the plurality of steps of the computer-implemented automated workflow.

7. The computer-implemented method of claim 6, wherein the graphical user interface further includes at least one selectable object that, when selected by the merchant, instructs configuration of different ones of the plurality of online stores that belong to the merchant.

8. The computer-implemented method of claim 6, further comprising:
using a merchant identifier belonging to the merchant to retrieve merchant permissions associated with the merchant;
based on the merchant permissions, instructing the merchant device to present, on the graphical user interface, a subset of possible selectable objects to limit the plurality of steps of the computer-implemented automated workflow that can be indicated by the merchant.

9. The computer-implemented method of claim 1, wherein each online store of the plurality of online stores that belong to the merchant has its own respective inventory and orders.

10. The computer-implemented method of claim 1, wherein storing the computer-implemented automated workflow in memory further includes storing a merchant identifier that identifies that the workflow is associated with the merchant.

11. A system comprising:
at least one processor to cause the system to:
  instruct a merchant device to present a graphical user interface on the merchant device;
  receive, from the merchant device, a first input via the graphical user interface, the first input including merchant login information, and in response update the graphical user interface to permit a merchant to create computer-implemented automated workflows specific to two or more of a plurality of online stores that belong to the merchant, each of the plurality of online stores having a respective different domain or subdomain associated with a corresponding website;
  receive, from the merchant device, a second input via the graphical user interface, the second input instructing creation of a new single computer-implemented automated workflow specific to each one of multiple online stores of the plurality of online stores and that applies to each one of the multiple online stores, the second input including an indication of a plurality of steps of the computer-implemented automated workflow, the plurality of steps including a trigger that triggers the computer-implemented automated workflow, wherein the trigger is in response to a change that occurs in relation to any one of the multiple online stores of the plurality of online stores; the plurality of steps of the computer-implemented automated workflow further including a condition, and an action to be taken by a computer if the condition is met, wherein the condition of the computer-implemented automated workflow is across the multiple online stores of the plurality of online stores and is therefore associated with at least two of the plurality of online stores that belong to the merchant, and wherein the condition includes at least two clauses joined by logical OR, each clause corresponding to a respective different one of the multiple online stores, wherein the workflow is configured to trigger only one instance of the action in response to the condition being satisfied; and
a memory to store the computer-implemented automated workflow and store a respective store identifier for each online store associated with the condition;
wherein the at least one processor is further to cause the system to:
  instruct the graphical user interface to display, on the merchant device, an indication of the created computer-implemented automated workflow;
  receive, from the merchant device, a third input via the graphical user interface, the third input instructing activation of the computer-implemented automated workflow for the multiple online stores, the graphical user interface permitting toggling between activation and deactivation of the computer-implemented automated workflow;
  subsequent to activation of the computer-implemented automated workflow, execute the computer-implement automated workflow, the executing including:
    in response to the trigger occurring in relation to any one of the multiple online stores, execute at least some of the plurality of steps of the computer-implemented automated workflow, including executing the condition and implementing the one instance of the action;
    wherein execution of the condition includes evaluating at least one of the at least two clauses joined by the logical OR, each clause corresponding to a respective different one of the multiple online stores, and for at least one online store associated with the condition: using the respective store identifier for the online store to retrieve information stored in association with the online store, and evaluating the information as part of executing the condition; and
    wherein implementing the one instance of the action includes automatically causing the action to be performed in response to the condition being satisfied for a single one of the multiple online stores.

12. The system of claim 11, wherein multiple steps of the computer-implemented automated workflow are each associated with more than one online store that belongs to the merchant.

13. The system of claim 11, wherein evaluating the information as part of executing the condition comprises using the information to determine whether the condition is true or false.

14. The system of claim 13, wherein the at least one processor is to use the respective store identifier for the online store to retrieve the information stored in association with the online store by: performing an application program interface (API) request, the API request using the respective store identifier and an indication of the information.

15. The system of claim 13, further comprising: if the condition is true, then the at least one processor further to cause the system to perform a particular action.

16. The system of claim 11, further comprising the at least one processor to instruct the graphical user interface to include one or more selectable objects that, when selected by the merchant, generate the indication of the plurality of steps of the computer-implemented automated workflow.

17. The system of claim 16, wherein the graphical user interface further includes at least one selectable object that, when selected by the merchant, instructs configuration of different ones of the plurality of online stores that belong to the merchant.

18. The system of claim 16, wherein the at least one processor is further to:
  use a merchant identifier belonging to the merchant to retrieve merchant permissions associated with the merchant;
  based on the merchant permissions, instruct the merchant device to present, on the graphical user interface, a subset of possible selectable objects to limit the plurality of steps of the computer-implemented automated workflow that can be indicated by the merchant.

19. The system of claim 11, wherein each online store of the plurality of online stores that belong to the merchant has its own respective inventory and orders.

20. The system of claim 11, wherein the memory is to store a merchant identifier that identifies that the computer-implemented automated workflow is associated with the merchant.

21. The computer-implemented method of claim 1, wherein the trigger occurs in response to a particular change occurring in relation to one of the multiple online stores as a result of customer interaction with the corresponding website of the one of the multiple online stores.

22. The system of claim 11, wherein the trigger occurs in response to a particular change occurring in relation to one of the multiple online stores as a result of customer interaction with the corresponding website of the one of the multiple online stores.

23. The computer-implemented method of claim 1, further comprising using a merchant identifier belonging to the merchant to retrieve merchant permissions associated with the merchant, and based on the merchant permissions, limiting triggers, conditions, and/or actions available for the creation of the new single computer-implemented automated workflow.

24. The system of claim 11, wherein the at least one processor is further to cause the system to use a merchant identifier belonging to the merchant to retrieve merchant permissions associated with the merchant, and based on the merchant permissions, limit triggers, conditions, and/or actions available for the creation of the new single computer-implemented automated workflow.

\* \* \* \* \*

UNITED STATES PATENT AND TRADEMARK OFFICE
CERTIFICATE OF CORRECTION

| | | |
|---|---|---|
| PATENT NO. | : 11,816,713 B2 | Page 1 of 1 |
| APPLICATION NO. | : 16/662204 | |
| DATED | : November 14, 2023 | |
| INVENTOR(S) | : Ayad et al. | |

It is certified that error appears in the above-identified patent and that said Letters Patent is hereby corrected as shown below:

In the Claims

At Column 27, Lines 66 and 67, Claim 1, "executing the computer-implement" should be - executing the computer-implemented -

At Column 29, Lines 57 and 58, Claim 11, "execute the computer-implement" should be - executing the computer-implemented -

Signed and Sealed this
Second Day of January, 2024

Katherine Kelly Vidal
*Director of the United States Patent and Trademark Office*